United States Patent [19]

Alperson

[11] 4,415,292
[45] Nov. 15, 1983

[54] FRAME CONNECTOR STRUCTURE

[76] Inventor: Paul Alperson, 305 Heavenly Dr., Omaha, Nebr. 68154

[21] Appl. No.: 83,849

[22] Filed: Oct. 11, 1979

[51] Int. Cl.³ .......................... B25G 3/00; F16B 9/00
[52] U.S. Cl. ................................... 403/246; 403/329; 292/352
[58] Field of Search ............... 403/245, 246, 329, 330, 403/189, 187; 292/352

[56] References Cited

U.S. PATENT DOCUMENTS

| | | | |
|---|---|---|---|
| 2,739,006 | 3/1956 | Fisler | 292/352 |
| 3,091,490 | 5/1963 | Williams | 403/329 X |
| 3,603,628 | 9/1971 | Smith | 403/329 |

*Primary Examiner*—Andrew V. Kundrat
*Attorney, Agent, or Firm*—George R. Nimmer

[57] ABSTRACT

One of two frame elements to be removably connected is telescoped over and removably latchably secured to the intervening connector structure. The removable latching means takes the form of a cantilever mounted spring component located internally of the connector structure hollow body component, the spring resilient forward portion including a locking projection upwardly urged through an apertured wall of the body component and into a registering-aperture of the telescoped frame element. The cantilever spring is of novel structural and internally mounted relationship with the hollow body component to prevent longitudinal slidable movement of the spring and to ensure that it will reliably, though yieldably, upwardly urge the locking projection through the apertured wall and into the registering-aperture of the frame element to be removably latchably secured.

5 Claims, 10 Drawing Figures

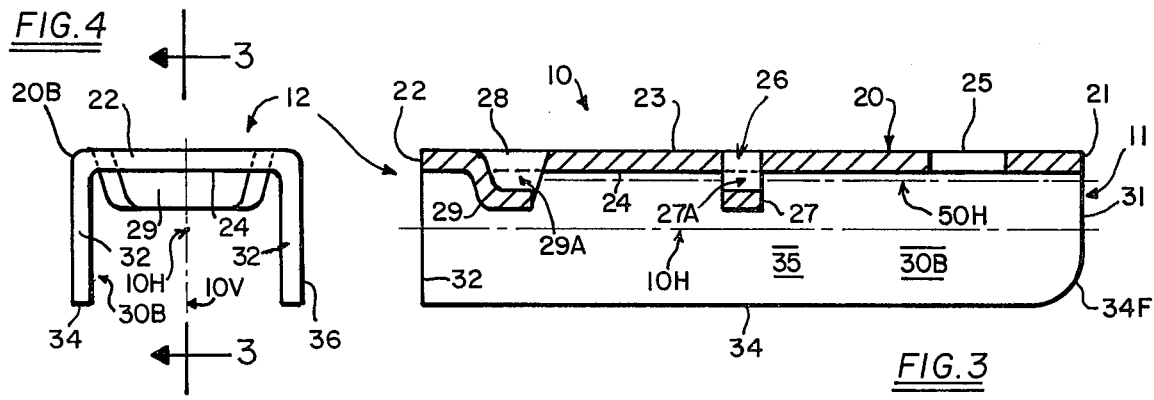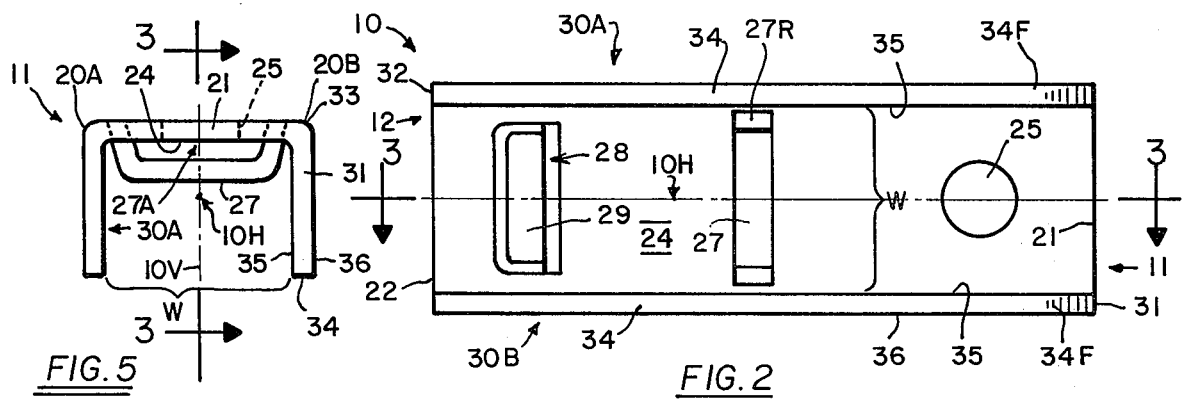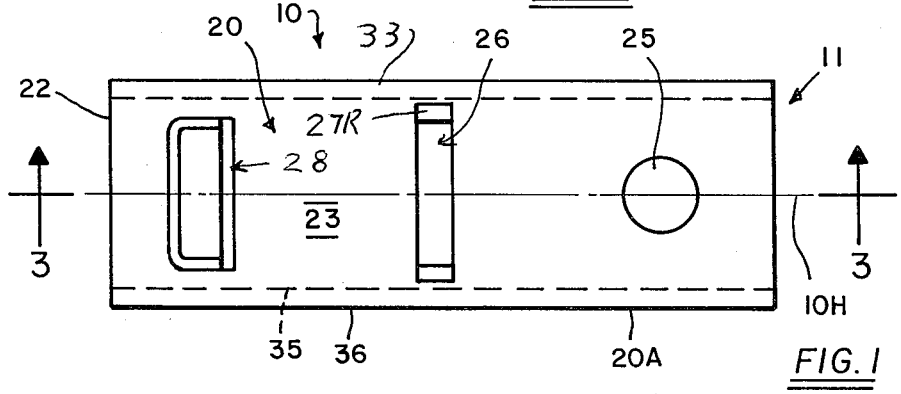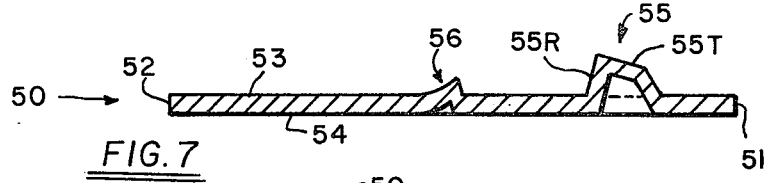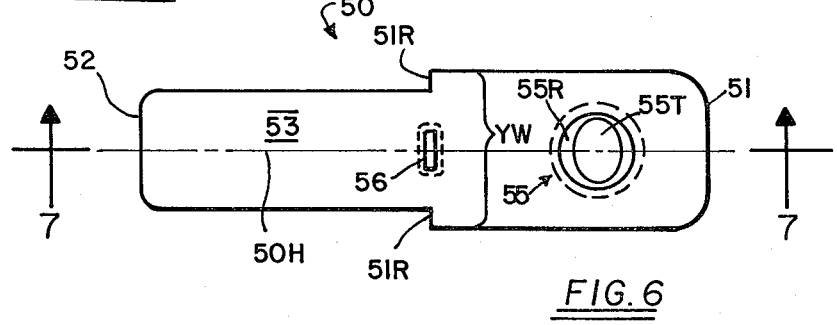

FRAME CONNECTOR STRUCTURE

Frame connector structures of the prior art are exemplified by the teachings of U.S. Pat. No. 3,603,628 (Sept. 7, 1971). Though there are advantages generally inherent in cantilever type springs, but primarily because of severe spatial constraints, prior art workers have not been successful in adequately incorporating cantilever springs into the frame connector structures of the instant art. Thus, as typified by U.S. Pat. No. 3,603,628, springs are traditionally mounted in non-cantilever fashion, namely on both sides of the frame connector body aperture through which the spring carried locking projection upwardly protrudes.

It is accordingly the general object of the present invention to provide an improved frame connector structure wherein the spring, equipped with locking projection, is internally mounted in cantilever fashion to the hollow body component. It is an ancillary general objective to provide a cantilever mounted spring component having adequate upward force for the locking projection and yet being restrained in both longitudinal directions, all within the severe spatial constraints of the hollow body component. It is another objective to provide a spring component that can be easily removably installed in reliably performing cantilever relationship with the hollow body component.

With the above and other objects and advantages in view, which will become more apparent as this description proceeds, the frame connector structure of the present invention generally comprises: a longitudinally extending rigid hollow body component having a fore-end and a rear-end, said body having an apertured wall and said wall between its aperture and rear-end being at least once transversely struck therethrough thereby providing a transversely extending fore-slot with a transversely extending strap therebelow, and a transversely extending shelf means located between fore-slot and body rear-end at substantially co-elevation with the transverse strap; and a substantially flat spring metal strip component longitudinally extending from forward-end to rearward-end thereof, the spring forward portion being provided with an upwardly extending locking projection surrounded by the body wall aperture and being further provided with an upwardly extending shoulder and in co-elevational registry with the wall fore-slot to prevent the spring from slidably moving longitudinally forwardly, means to prevent the spring from slidably moving longitudinally rearwardly, and the spring rearward-end being supported atop the shelf means and the spring medial portion being girded by the body transverse inward strap whereby the cantilever spring maintains the locking projection portion protruding through the wall aperture and for receiving the registering-aperture of the frame element to be connected.

In the drawing, wherein like characters refer to like parts in the several views, and in which:

FIG. 1 is a top plan view of the body component of a preferred embodiment of the frame connector structure of the present invention;

FIG. 2 is a bottom plan view of the body component of FIG. 1;

FIG. 3 is a longitudinally extending sectional elevational view taken along lines 3—3 of FIGS. 1, 2, 4, and 5;

FIG. 4 is a rearward elevational view of the body component of FIG. 1;

FIG. 5 is a forward elevational view of the body component of FIG. 1;

FIG. 6 is a bottom plan view of the flat spring metal strip component of a preferred embodiment of the frame connector structure of the present invention;

FIG. 7 is a longitudinally extending sectional elevational view taken along line 7—7 of FIG. 6;

Figure 9:
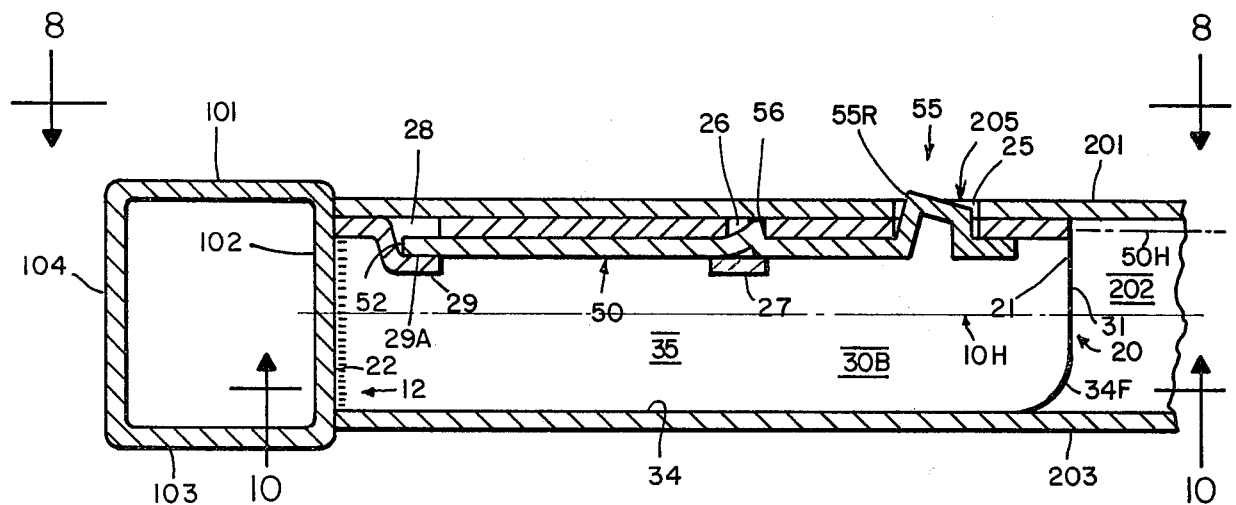
Figure 10:
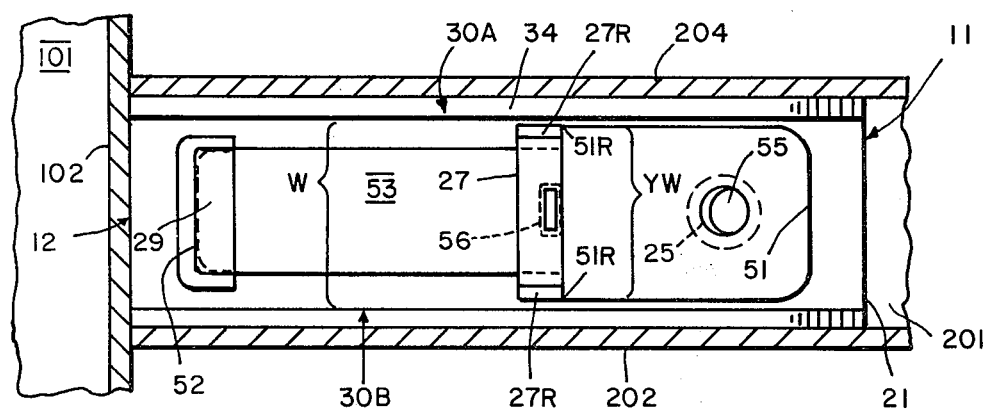
Figure 8:
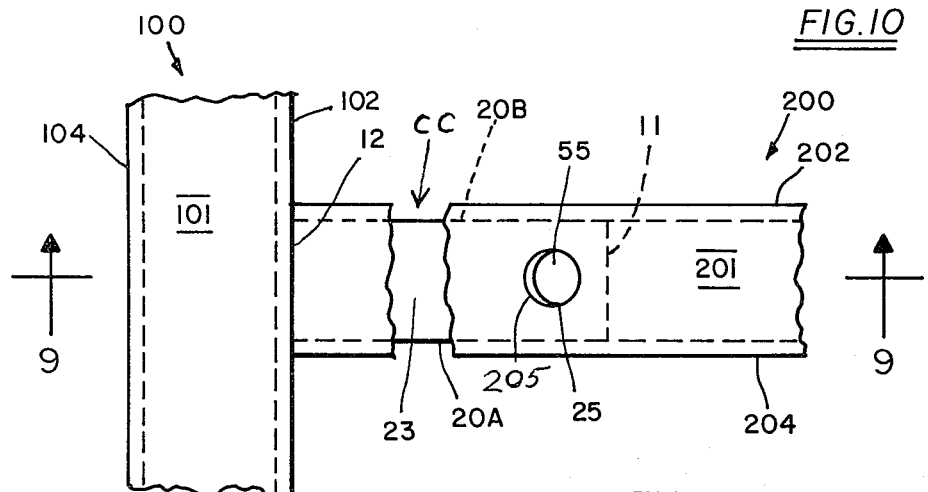
FIG. 8 is a top plan view of two frame elements effected in removably connected relationship with the preferred embodiment of the frame connector structure of the present invention.

FIG. 9 is a longitudinally extending sectional elevational view, analagous to FIGS. 3 and 7, taken along line 9—9 of FIG. 8 showing the preferred embodiment of the frame connector structure of the present invention; and FIG. 10 is a sectional plan view taken along line 10—10 of FIG. 9 and revealing the bottom plan view of the preferred embodiment frame connector structure of the present invention.

As will be pointed out later in greater detail relative description of FIGS. 8–10, the frame connector structure of the present invention generally comprises a longitudinally extending rigid hollow body component (the preferred embodiment being depicted in FIGS. 1–5) and a longitudinally extending substantially flat spring metal strip component including upwardly extending locking projection and shoulder means (the preferred embodiment being depicted in FIGS. 6 and 7).

Turning initially to FIGS. 1–5, the preferred embodiment body component 10 is a rigid hollow member extending longitudinally along horizontal central-axis 10H, and having two upright body-ends including a fore-end 11 and a rear-end 12. Body 10 necessarily includes an apertured (25) wall e.g. 20, extending longitudinally between the upright body-ends 11 and 12 and including an outer surface 23 and an inner surface 24. Herein, apertured wall 20 is rectangular as seen in top plan view including; transversely extending and parrallel lead-end 21 and tail-end 22 at fore-end 11 and at rear-end 12, respectively; longitudinally extending and parallel left-edge 20A and right-edge 20B at outward surfaces 36 of parallel vertical flanking-walls 30A and 30B, respectively; and longitudinally extending and parallel planar rectangular outer surface 23 and inner surface 24. The preferred body component is substantially U-shaped in transverse cross-section including the vertical flanking-walls 30A and 30B, each of which extends longitudinally 31–32 between the upright body-ends 11 and 12. Each flanking-wall 30 has a longitudinally extending horizontal top-edge 33 merging along the entire length 21–22 of wall edges 20A and 20B whereby transversely separated flanking-walls 30A and 30B depend from intervening apertured wall 20 and are in structurally continuous monolithic relationship therewith. Each vertical flanking-wall 30 has an inward surface e.g. upright surface 35, and has an outward surface e.g. upright surface 36, surfaces 35 and 36 being preferably vertical, planar, and parallel to each other and to vertical-axis 10V, whereby there is a regular transverse finite-width "W" between flanking-walls inward surfaces 35. Though the longitudinally extending bottom-edge 34 of flanking-walls 30 is desireably horizontal and parallel to central-axis 10H and to top-edge 33, it is rounded at its juncture 34F with the frontal extremity 31 at body fore-end 11. The aperture 25 of the intervening and primary body wall 20 overlies axis 10H and is located many-fold more remote from body rear-end 12 (e.g. tail-end 22) than from body fore-end 11 (e.g. lead-end 21).

Primary wall 20 between its aperture 25 and its tail-end 22 (e.g. at body rear-end 22) is transversely struck therethrough whereby said wall is provided with a transversely extending fore-slot 26 and wall structural material is depressed below said fore-slot 26 to provide a transversely extending horizontal strap 27 spatially (27A) recessed inwardly below wall inner surface 24. There are transversely extending shelf means e.g. 29, spatially (29A) recessed inwardly below primary wall inner surface 24 for supporting the spring rear-end 52. Spatial gaps 27A and 29A are of substantially co-elevation as seen in FIGS. 3 and 9. Herein, the primary wall 20 between fore-slot 26 and tail-end 22 is transversely struck therethrough whereby said wall is provided with a transversely extending rear-slot 28 and wall structural material is depressed below said rear-slot 28 to provide a transversely extending shelf 29 spatially (29A) recessed inwardly below wall inner surface 24. For reasons to be explained later in greater detail, the transverse width of strap 27 closely approximates finite-width "W" and exceeds the transverse width of shelf 29. Relative body rear-end 12 and tail-end 22, fore-slot 26 and underlying strap 27 is located many-fold more remote therefrom as compared to the longitudinal distance of the shelf means (e.g. 29) from the same body-end 12.

Turning now to FIGS. 6 and 7, the preferred embodiment 50 of the substantially flat spring metal strip component longitudinally extends along horizontal spring-axis 50H from forward-end 51 to rearward-end 52 and has an upper surface 53 and a lower surface 54. The spring forward portion immediately rearward its forward-end 51 is centrally provided with an upwardly extending locking projection 55 to be ultimately permanently surrounded by wall aperture 25. The height of locking projection 55 is preferably slightly higher at its rearward side 55R whereby its top-surface 55T slopes downwardly and forwardly of 55R. The spring forward portion rearwardly of locking projection 55 is centrally provided with an upwardly extending shoulder 56 to be ultimately surrounded by wall fore-slot 26 to prevent the installed spring 50 from moving longitudinally forwardly. In this vein, shoulder 56 is located nearer to spring forward-end 51 than to rearward-end 52; moreover, locking projection 55 is located at least twice as far from shoulder 56 than from spring forward-end 51. Though the spring surfaces 53 and 54 are generally planar and parallel to each other, to wall inner surface 24, and to spring axis 50H, the conventional process for forming locking projection 55 and shoulder 56 distorts the spring metal broad surfaces 53 and 54 at areas 55 and 56.

The transverse finite-width "YW" for cantilever spring 50 is to be maximized to ensure sufficient spring force for protrusion of locking projection 55 into wall aperture 25 and upwardly beyond wall outer surface 23; ideally, finite-width "YW" closely approximates the finite-width "W" for body component 10. There are means to prevent the installed spring from slidably moving longitudinally rearwardly. Such rearward movement limiting means might be provided by making the spring rearward portion slightly transversely narrower than the forward portion whereby the rearward extremities 51R of the installed spring forward portion might abut the forward side of strap 27 at ends 27R.

As has already been alluded to, the preferred frame connector embodiment "CC" comprises spring component 50 installed in cantilever fashion along spring axis 50H into body component 10. This is especially clearly revealed in that drawing FIG. 9 is a substantial superimposition of drawing FIG. 7 upon drawing FIG. 3. Specifically, cantilever installation of spring 50 entails the longitudinally rearward moving of spring rearward-end 52 along axis 50H through spatial gap 27A until the rearward extremities 51R of the spring forward portion abut the forward side of the two transversely separated ends 27R of strap 27. When extremities 51R abut strap ends 27R, the spring rearward-end 52 is atop the shelf means (e.g. 29) and preferably abuts the rearward extremity thereof, and shoulder 56 is abutting the forward side of fore-slot 26 whereby the locking projection 55 of the thus cantilever mounted spring protrudes upwardly through wall aperture 25, even into registering-aperture 205.

As also indicated in FIGS. 8-10, use of the frame connector structure e.g. "CC", of the present invention is analagous to the prior art. Tubular frame element 100 might comprise four interconnected panels 101-104, and the second or rear-end (e.g. 12,22, 32) of connector "CC" is weldably or otherwise rigidly attached to panel 102. Tubular frame element 200 might comprise four interconnected panels 201-204, and is longitudinally telescoped over connector "CC" whereby; panel 201 overlies connector apertured wall 20; registering-aperture 205 of panel 201 overlies aperture 25; and locking projection 55 is surrounded by registering-aperture 205 thus preventing longitudinal disengagement of frame element 200 from connector "CC". Whenever it is desired to longitudinally disengage frame element 200 from connector "CC", a hammer or other tool is employed to resiliently depress locking projection 55 below apertured frame panel 201.

From the foregoing, the construction and operation of the frame connector structure of the present invention will be readily understood and further explanation is believed to be unnecessary. However, since numerous modifications and changes will readily occur to those skilled in the art, it is not desired to limit the invention to the exact construction shown and described, and accordinly, all suitable modifications and equivalents may be resorted to, falling within the scope of the appended claims.

I claim:

1. A hollow, unit handled, self locking connector structure adapted to be closely telescopically received within a hollow frame member having a registering-aperture to form a rigid joint therewith, said frame connector structure comprising:

A. a longitudinally extending rigid hollow body component that is substantially U-shaped in transverse cross-section and having two upright body-ends including a fore-end and a rear-end, said body including an apertured wall extending longitudinally between the body-ends and including an inner surface and an outer surface, said wall between the apertured portion thereof and body rear-end being at least once transversely struck therethrough whereby the wall is provided with a transversely extending fore-slot and wall structural material is depressed below said fore-slot to provide a transversely extending underlying strap recessed inwardly the wall inner surface, transversely extending shelf means recessed inwardly the wall inner surface and located between the fore-slot and the body component rear-end, said apertured wall inner surface being in intervening relationship to transversely separated flanking-walls for said body and providing a regular transverse finite-width between the flanking-walls; and B. a substantially flat spring metal strip component longitudinally extending from forward-end to rearward-end thereof and having broad upper and lower surfaces, the spring forward portion immediately rearwardly its forward-end being provided with an upwardly extending locking projection surrounded by the body wall aperture, said spring forward portion being further provided with an upwardly extending shoulder located rearwardly said locking projection and in co-elevational registry with the wall fore-slot to prevent the spring from slidably moving longitudinally forwardly, the spring forward portion being transversely wider than the spring rearward portion and abutting the said body transverse strap, the transverse-width of the spring forward portion exceeding nine-tenths the finite-width of the apertured wall inner surface, and said spring rearward-end being supported atop said shelf means and said spring being surrounded by said body inwardly recessed strap whereby the spring is mounted inside the body component in cantilever fashion so as to normally maintain the locking projection elevated above the apertured wall outer surface and for receiving the registering-aperture of the hollow frame member to be removably connected.

2. The frame connector of claim 1 wherein the wall aperture is located many-fold more remote from the body rear-end than from the body fore-end; wherein the fore-slot and underlying strap are located nearer the wall aperture than to the shelf means; and wherein the flanking-walls bottom-edges are curved at the body fore-end.

3. The frame connector of claim 2 wherein the inner surface and outer surface of the apertured wall are substantially planar and co-parallel; and wherein the flanking-walls are substantially planar and co-parallel whereby the apertured wall inner surface has said regular transverse finite-width.

4. The frame connector of claim 1 wherein the wall aperture is located many-fold more remote from the body rear-end than from the body fore-end; and wherein the forward side of the fore-slot is located closer to the body fore-end than to the shelf means.

5. The frame connector of claim 4 wherein the apertured wall is additionally transversely struck therethrough immediately forwardly of the body rear-end to provide said shelf means; and wherein the fore-slot and underlying strap are located many-fold more remote from the shelf means as compared to the longitudinal distance between the shelf means and body rear-end.

* * * * *